Oct. 14, 1969  A. ZAUSZNICA  3,472,061
TRANSMITTING ELEMENT FOR GAUGING INSTRUMENTS
Filed July 25. 1967  2 Sheets-Sheet 1

INVENTOR.
Adam Zausznica
BY
Pierce, Scheffler & Parker
Attorneys

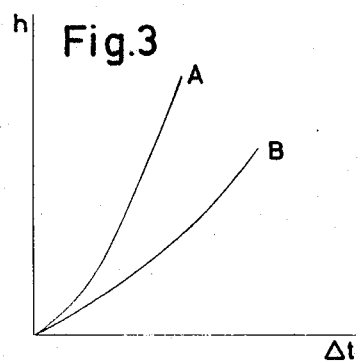
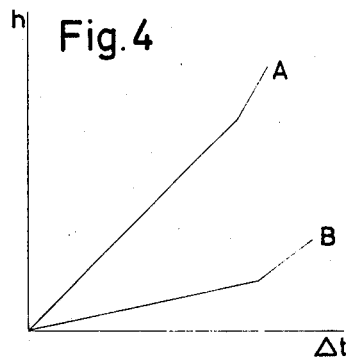
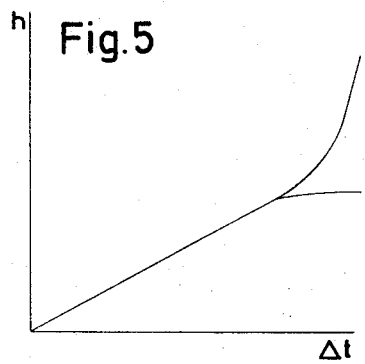
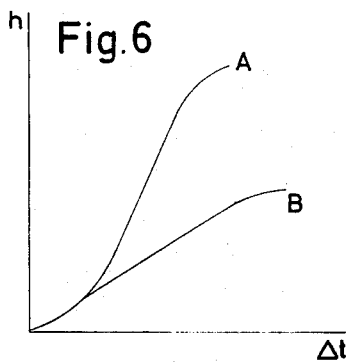
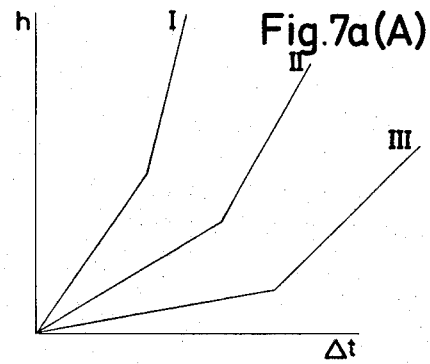
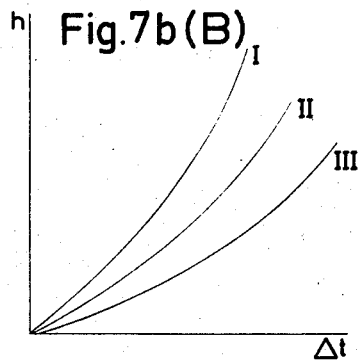

United States Patent Office 3,472,061
Patented Oct. 14, 1969

3,472,061
TRANSMITTING ELEMENT FOR GAUGING INSTRUMENTS
Adam Zausznica, Stockholm, Sweden, assignor to Ingenjorsfirma A. Alfredeen AB
Continuation-in-part of application Ser. No. 284,968, June 3, 1963. This application July 25, 1967, Ser. No. 655,894
Int. Cl. G01b 13/08
U.S. Cl. 73—37.5
2 Claims

ABSTRACT OF THE DISCLOSURE

A pneumatic gauging instrument with a tubular body having a movable piston therein. The tubular body has openings in its side walls for the flow of air. The openings have sharp edges adjacent to the inner surface of the tubular body and are partially covered and closed by said piston. The piston is displaced according to the change in dimension of the object to be measured and thereby produces a strict proportional relationship between changes in the dimension of the object to be measured and the indications made by an indicator.

---

This application is a continuation-in-part of my application Ser. No. 284,968 filed June 3, 1963, now U.S. Patent No. 3,344,810 granted Oct. 3, 1967.

Due to the fact, that pneumatic gauging instruments have been applied in engineering industry for more than thirty years, a great number of different types and makes are used both in product control departments and at working places. The known instruments are different in construction and operate after different principles. Irrespective of their variations in type and working principle, however, the said instruments can be observed to follow a common basic functional principle and a common line of indicating the results of their measurements.

By this general functional principle common to all types of said instruments, it is possible to make comparisons between the various types.

In complete state, a pneumatic gauging instrument comprises three main elements, i.e. (a) transmitting element, (b) converting link, and (c) indicator.

The transmitting element has as its object to receive the impulses of varying size responsive to alterations in the dimensions of the object to be measured, and to transmit the impulses in one way or the other to the next functional element.

The converting link receives corresponding impulses from the transmitting element at its receiving end, converts them into signals adequate for the secondary, or more precisely, the emitting end and transfers the signals to the indicator.

The indicator has as its functional object to express the signals received from the converting link in a clear and comprehensible manner, for example, visually on a dial, drawn on a diagram, etc.

In the production of a rational pneumatic gauging instrument, it is desired that linear displacements of the sensing member of the transmitting element caused by alterations in the dimensions of the object to be measured will result in linear displacements of the visualizer of the indicator element.

It is the main object of a great number of pneumatic gauging instruments to get linear displacements of the sensing member during the measuring operation expressed by corresponding linear displacements of the indicator. The problem, however, is that in practice none of the known pneumatic gauging instruments can produce such proportionality between displacements of the sensing member i.e., variations in the dimensions of the object measured, and the alterations visualized by the indicator.

The functional principle of all known pneumatic gauging instruments deviates, from the theoretical principles and makes to a greater or smaller degree use of approximation which, one has to admit, constitutes within certain limits, determined by practice, the satisfactory operational basis for the functioning of the gauging instrument. For illustrating the fact, the functions of the functional elements comprised in pneumatic gauging instruments will be analyzed in the following.

It can be observed immediately that the following mode of thinking is common to all constructional embodiments: a sequence of impulses and signals which both are alleged to be of linear nature are transmitted through all of the said functional elements. The said propagation of impulses and signals as well as their alleged linear nature can be illustrated by the diagram as follows.

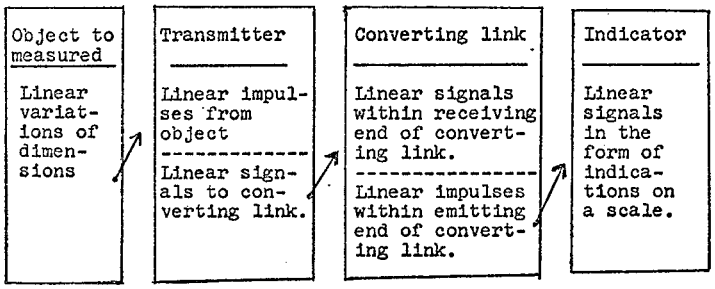

The approximation mentioned above is practiced in each of the elements shown in the diagram. It is already found in the transmitting element, due to the fact that this element irrespective of its type and construction is based on empirical facts and a fully conscious compromise against the theoretical rules and principles. What distinguishes the different types of transmitting elements is substantially only the size and degree of the said approximation.

The same situation, even to a larger extent and in a wider scope, is found when analysing the converting link. The converting element is usually a pressure vessel comprising a device of the Bourdon tube type, a bellows of different types, an expansion box, resilient vessel, a diaphragm of various types and materials (goffered or flat) and the like. It is obvious that a functional converting element operating with the help of one of the aforesaid devices is by no means capable to produce a proportional relationship between the alterations of impulses received by the device and the signals emitted, i.e. between, for example, the changes in pressure at the receiving end of the converting element and the changes of the geometrical configuration of the converting device, which changes are emitted to the indicator.

What occurs in the converting link is, thus, an approximation in the proportionality between the size of the impulses and the corresponding signals.

As regards the situation in the indicating functional element, a linear relationship between the impulse side of the indicating element and the indications by the visualizer can be obtained by using a liquid column as visualized. If the indicator is based on a different principle (spring mechanism, lever system etc.), proportionality cannot be obtained.

The known pneumatic gauging instruments are, consequently, not capable to produce a proportional relationship between the changes in the dimensions of the object measured, which changes are of a linear nature, and the visualizer of the gauging instrument, for example a linear scale, due to the approximation occurring in the said three links, or at least in two of them. Endeavours to evade this drawback caused by the accumulated approximation within each functional step have been undertaken. The British Patent No. 903,120 consists in such an attempt. Years of practice with the invention described in the ptaent have demonstrated some inconvenience with the use of said invention under certain conditions, namely: with indicators working with low air pressure. The air flow might become laminar with all resulting consequences from that fact. As a matter of fact in the cylindrical body provided in its wall with the air outlet opening has a quite unnegligible wall thickness. The final discharge of the air flow is determined by the extreme outer shape of the outlet i.e. by the surface which is identical with the outer surface of the cylindrical body. This fact involves the obturating function of the piston which slides against the inner surface of the cylindrical body cannot be perfect and absolute, as there exists a geometrical gap between the edge of the piston which obturates the outlet opening in the cylindrical body and the discharging surface of the said outlet opening. That sort of clearance disturbs the precision and the adequateness of the calculations of the constructive data with regard to the practical results, they become under some conditions named above difficult to anticipate and foresee.

The present invention does not include the drawback described above.

Firstly the present invention transforms the outlet opening in the wall of the cylindrical body into a mouth-opening i.e. without a dimension in the direction of the air flow. The thickness of the wall of the cylindrical body is brought to negligible dimensions 0.05–0.1 mm. so that the borders of the outlet opening may be defined as "knife sharp" or sharp edged etc.

Secondly the present invention transports the discharging profile of the outlet opening from the outlet surface of the cylindrical body to the inner surface, i.e. the inner surface of the cylindrical bore in which the obturating piston is fitted and sliding. By this means the clearance between the piston and the discharging profile is eliminated.

Thirdly by this construction the difference in behaviour of the gauging instrument with regard to laminar or turbulent air flow is eliminated. In reality through the sharp edged opening with substantially no dimension in the direction of the flow there is no possibility of recreation of a laminar air flow even under most favourable conditions.

Finally: the placing of the outlet opening upon the inner cylindrical surface of the cylindrical bore and the fact that the obturation of said outlet takes place upon the same surface, liberates the computation of the final shape of the outlet opening from involved equations of flow dynamics and simplifies the problem into almost purely mathematical calculations.

The present invention takes into consideration all approximation which appears within the functional elements of the instrument and compensates its action in order to produce a strictly proportional relationship between the changes in the dimensions of the object to be measured and the indications made by the indicator.

The present invention is then not based on the alleged principle of proportionality between linear alternations of the sensing member of the transmitting element and the variations of the air flow parameters; in a strict meaning, such proportionality does not exist.

Instead of neglecting the importance of the deviations within the converting functional element of the gauging instrument and instead of accepting approximative converting of the functions concerned, the invention attributes to the said deviations such an importance that the type and size of the deviations are included in the calculation.

The invention takes also into consideration the deviations from linearity which may possibly occur in the final functional element, i.e. the indicator. Thanks to its special construction the invention secures identical and repeatable impulses under all pressure and air flow conditions, making impossible transmission or re-creation of a laminar flow across the discharging elements of the transmitter.

To summarize: the invention produces a strict proportional relationship between the changes in the dimensions of the object to be measured and the indications made by the indicator, due to a special construction of the transmitting element according to which the effects of all incorrectnesses and deviations are fully compensated for approximations governing within all functional elements of the gauging instrument.

The invention also renders it possible, thanks to the named, specially adapted construction of its transmitting element to produce and hold unchangeable under all possible circumstances even other desired relationship between the linear alterations of the object measured and the indications made by the indicator (the said relationship being such that it can be advantageous from a production point of view).

The characterizing features of the invention in relation to the present state of art may be summarized as follows:

(1) The invention is characterized by a construction based on the linear displacements of a piston within a cylindrical body, said displacements being responsive to the changes in the dimensions of the object to be measured and their effect on the variations of the air passage area of the outlet opening cut out in the wall of the cylindrical body.

(2) The invention is characterized in that the aforesaid air passage area or areas (outlets) are formed in such a manner that the linear displacements of the piston result in a desire, even an entirely different (i.e. non-linear) mathematical function of the flow parameters, for example of the pressure prevailing in the flow. An example of the process of the said functions is expressed in the curves shown in FIGS. 3 to 7.

(3) The invention is characterized in that the functions deviating from the linearity can be of such an effect on the subsequent elements operating with certain known distortions that the said distortions are compensated for in such a manner that the final result, i.e. the indicating function is linear.

(4) The invention (as an alternative to item 3 above) is characterized in that the functions deviating from the linearity are of such an effect on the subsequent elements operating with certain known distortions that the said distortions are exaggerated or damped, either from the beginning or from a certain point of the tolerance, continuously or alternately etc. so that the final result of the gauging process, i.e. the indicating function assumes a desired nature.

The invention is illustrated in the accompanying drawings in which.

Figure 2B:
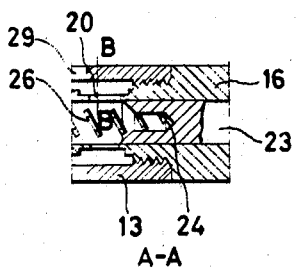
FIG. 2b is a section on the line A—A of FIG. 2.
Figure 2C:
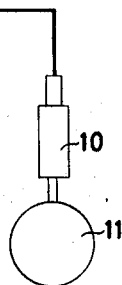
FIG. 2c is a section on the line B—B of FIG. 2b.
Figures 2D, 2E:
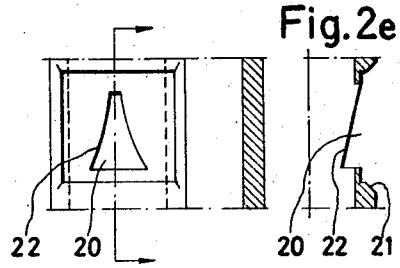
FIG. 2 is a longitudinal sectional view of the transmitter element.
Figure 2:
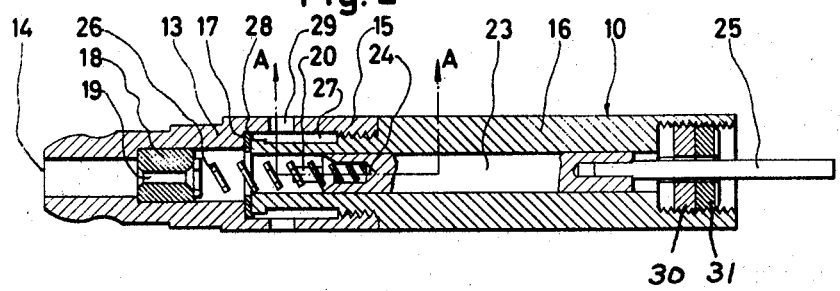

FIGS. 2d and 2e are a front view and side view respectively of the opening 20 of FIGS. 2, 2b and 2c, and FIGS. 3, 4, 5, 6, 7a(A) and 7b(B) are functional curves of transmitter elements having differently shaped outlets.

The structure of the gauging instrument and particularly the transmitter element will be pointed out in the following description of their operations.

Figure 1:
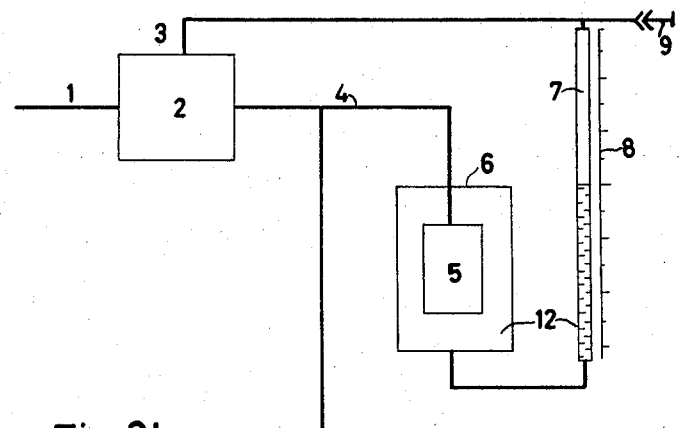
FIG. 1 is a diagrammatic illustration of a gauging instrument.

Cleaned and dewatered air of constant working pressure is directed through an air passage 1 to an air distribution and pressure stabilizing chamber 2 and discharged therefrom through two channels 3 and 4 each of which is divided into two separate lines. Channel 3 branches off into two additional lines whereof one communicates through a control valve 9 with the atmosphere and the other communicates with the upper end of a liquid pipe 7, said pipe being part of a U-shaped vessel 12. Channel 4 which extends from the distribution chamber 2 branches off into a line for directing the air to a member 5 adapted to change under pressure, said member forming the converting functional element of the gauging instrument, and into a second line through which the air is directed through the transmitter element 10 out into the atmosphere. In this embodiment, the converting functional element 5 is a pressure box immersed in a liquid container 6. By pressure effect, the volume of the box increases and an excess amount of liquid is pressed out from the liquid container 6 to the pipe 7. In pipe 7, the liquid level raises to a certain value on the linear scale 8. The liquid level in pipe 7 depends substantially only on the pressure in box 5 which is actuated exclusively by the outflow through the areas of the transmitter element 10. The lastmentioned variations are determined by the variations in the dimensions of the object 11 to be measured (FIG. 1).

According to the invention, an embodiment of the transmitter element having the aforedescribed functions and properties may comprise a two-part cylindrical body 13 and 16 whereof the end surface of part 13 facing away from part 16 is an inlet 14 for the air flow and part 16 is connected with part 13 by a threaded part 15 and a sealing member 28 against a shoulder 17. In the inlet 14 there is provided an exchangeable nozzle 18 with aperture 19 of a suitable diameter. On its generatrix surface part 16 is provided with one, possibly several outlet openings 20 extending through the wall and being of a special shape.

The form of the outlet openings 20 extending through the wall depends on the parameters of the flow and the response desired to be given by the transmitter. This form can vary from purely rectangular to a complicated quadrangular one with curved sides (and linear base and top).

By an eccentric grinding 21 of part 16, the wall is made thinner in the proximity of the outlet openings 20, so that a sharp edge 22 is formed on said outlet openings (FIG. 2c). In the case when the form of the quadrangular opening has an essentially wider (longer) base than top the above named grinding only of part 16 is not sufficient in order to produce the sharp edge along the whole curved side of the openings 20 (FIG. 2d) and for this purpose one adopts a grinding effectuated with inclined axis against the part 16. Profiled grinding is also possible as well as other methods resulting in shaping a sharp edge of the sides of the openings 20 are thinkable.

The other end of the part 16 has internal threads with two screws threaded therein whereof one is an adjusting screw 30 and the other is a stop screw 31 by means of which the stroke of the piston 23 in the part 16 is limited. Said piston 23 has a recess 24 in its end surface facing toward the part 13, the mouth of said recess having a sharp edge. On the other end of the piston 23 is the rod 25 extending through the screws 30 and 31. A spring-like helically shaped element 26, preferably of thin wire having a rectangular cross-section is positioned between the bottom of the recess 24 and the nozzle 18. The said helical element and the recess proper insure a turbulent flow of air through the outflow opening or openings 20 of the cylindrical part 16. Between the parts 13 and 16 which are screwed together at 15 there is an intermediate annular space 27 which however is of irregular shape due to the grinding of the part 16 around the outlet opening 20. Holes 29 in the wall of part 13 provide outlets for air from the space 27.

According to FIGS. 2, 2b, 2c and 2d the outlet openings 20 have a quadrangular form but said openings may be shaped in many different ways whereby a great number of different appearances of the functional curve of the transmitter can be obtained as appears from FIGS. 3-7.

For practical comparisons with the results obtained by using outflow sharp edged openings of different shape in the transmitter element of a certain type of gauging instrument, i.e. a certain type of the converting link of the transmitter element, curves are drawn of the parameters shown in FIGS. 3-7, said curves connecting different conditions between the reading length on the scale $h$ of the indicator and the insertion depth $\Delta t$ of the piston, which depth is equal to the restriction of the outlet opening in the leading direction.

It appears clearly from the aforesaid that it is possible to obtain a curve for the function of the transmitter element of substantially optional shape by giving the throughflow opening a special configuration, which configuration conceived by the form of the spatial curves of said opening's sides pays regard to the processes and elements of all functions (inclusive distortions) occurring in the functional elements of the gauging instrument.

(1) If linear functional curves (as on FIGS. 4, 5, 6 and 7a(A)) have to be obtained, the shape of the outlet opening is determined as follows:

(a) by an exponential spatial curve if the converting element supplies linearly or exponentially variable impulses.
(b) by a hyperbolic spatial curve of the distortions of the converting element are of different character.

(2) If parabolic functional curves (as shown on FIGS. 1 and 7b(B)) are required the outlet opening is shaped by the following curves:

(a) an arc of an ellipse if the converting element works without distortion,
(b) a spatial curve profiled by two intersecting cylindrical surfaces (one of which only is circular) if there exists a disturbant factor within the converting link of non exponential character; (if the distortions are exponential the case as per 1b) above is actual.

By these formulation the physical characteristics of each of the outlets from which said functional curves have been arrived are positively and sufficiently determined.

The physical characteristics of an outlet opening are determined by:

(1) An exponential spatial curve if:
(a) the converting link supplies exponentially or linearly variable impulses and
(b) if one wants to obtain one of the functional curves shown on FIGS. 4, 5, 6 and 7a(A).

(2) An hyperbolic spatial curve if:
(a) the converting link supplies other than linearly or exponentially variable impulses, and
(b) if one wants to obtain functional curves as above.

(3) An arc of an ellipse if:
(a) the converting link works without distortions and
(b) if one wants to obtain a functional curve as shown on FIGS. 1 and 7b(B).

(4) A spatial conical curve profiled by an intersection of two cylinders if:
(a) the converting link transmits impulses non exponentially disturbed and
(b) if one wants to obtain functional curves as on FIGS. 1 and 7b(B).

The adaptability of the transmitter element to different types of gauging instruments or to different working pressure conditions of one and the same type of instrument is increased in that in the inlet side of the front portion 13 of the cylindrical body there is mounted an exchangeable nozzle 18. FIGS. 7a(A), 7b(B) shows how the transmitter element, by having a nozzle of suitable throughflow holes 19 can be used for measuring with substantially changed function curves, i.e. such function curves which connect the displacement of the piston with indications on the indicator scale corresponding to the respective displacements. The curves shown refer to measurements made at an air pressure of 0.5 excess atmospheric pressure and by using two different outlet openings A and B, I, II and III on the respective curves refer to the hole diameters of 3, 1.5 and 1.1 mm. respectively of the three nozzles. In practice, this provides an extraordinary possibility for obtaining the most suitable reading length on an indicator scale even by choosing a nozzle with suitable hole diameter at a certain tolerance.

The invention is not restricted to the embodiment described above and shown on the accompanying drawing, but may be modified in many different ways within the scope of the inventive idea.

I claim:

1. A transmitter element for pneumatic gauging instruments functioning by effecting balance between two air streams in the gauging instrument, said transmitter element comprising a substantially tubular body divided into two parts, one of said parts including an inlet at one end thereof for an air stream, the other of said parts being constructed as a hollow cylindrical for receiving said air stream from said first part, a piston slidable into and out of said cylinder, said cylinder including at least one air outlet through the wall thereof for discharge of said air stream, said outlet having a section corresponding to a certain desired relation between the parameters of the air flow and the insertion depth of said piston which partly covers said outlet, the surfaces of said hollow cylindrical part being eccentrically ground in the proximity of said outlet at a radius exceeding essentially the external radius of said hollow cylindrical part to establish sharp edges at said outlet, and the axis of the surface formed by the peripheral edge of the ground portion of said hollow cylindrical part being inclined with respect to the axis of said hollow cylindrical part.

2. A transmitter element as defined in claim 1 wherein the radius of said eccentrically ground surface varies continuously.

References Cited

UNITED STATES PATENTS 3,344,810   10/1967   Zausznica _____ 73—37.5 XR

FOREIGN PATENTS 903,120   8/1962   Great Britain.

LOUIS R. PRINCE, Primary Examiner

WILLIAM A. HENRY II, Assistant Examiner